(12) United States Patent
Grigoriu et al.

(10) Patent No.: US 7,516,048 B2
(45) Date of Patent: Apr. 7, 2009

(54) EXTERNALIZED METRIC CALCULATION ENGINE

(75) Inventors: Bogdan Grigoriu, Toronto (CA); Linwood Earl Loving, Mechanicsville, VA (US); Donald Eugene Schaefer, Longmont, CO (US); Wayne A. Scott, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 11/479,471

(22) Filed: Jun. 30, 2006

(65) Prior Publication Data
US 2008/0004827 A1 Jan. 3, 2008

(51) Int. Cl.
*G06F 19/00* (2006.01)
*G06F 17/40* (2006.01)

(52) U.S. Cl. .................. 702/186; 702/108; 702/127; 702/182; 702/189; 702/113; 702/123; 379/15.01; 379/9.03; 379/2; 379/15.03; 379/22; 379/25; 379/26.01; 379/27.01; 370/244

(58) Field of Classification Search .................. 702/185, 702/186, 108, 127, 182, 189, 113, 123; 379/15.01, 379/9.03, 2, 15.03, 22, 25, 26, 26.01, 27.01; 370/244
See application file for complete search history.

(56) References Cited

U.S. PATENT DOCUMENTS

| 6,209,033 | B1 * | 3/2001 | Datta et al. ................. 709/224 |
| 6,636,585 | B2 * | 10/2003 | Salzberg et al. ............... 379/22 |
| 2003/0135606 | A1 * | 7/2003 | Goodwin et al. ............ 709/224 |
| 2005/0068890 | A1 | 3/2005 | Ellis et al. .................. 370/229 |

FOREIGN PATENT DOCUMENTS

WO  WO 01/28219 A2  4/2001

* cited by examiner

*Primary Examiner*—Tung S Lau
*Assistant Examiner*—Sujoy K Kundu
(74) *Attorney, Agent, or Firm*—Arthur J. Samodovitz; Law Office of Jim Boice

(57) ABSTRACT

Calculating, detecting, observing, and validating operating characteristics, conditions, and metrics, especially quality of service metrics, of a system. The quality of service metrics are reported and utilized to manage the service. The various elements of the system for generating the quality of service metrics are integrated, with the same or substantially the same schema and metadata in the databases management systems of the externalized metric configuration data database, and the raw transaction data database. There is extensive code reuse, with the various engines, as the standard requirements methodology engine and thee standardized extensible calculation engine utilizing the same classes or objects, and as appropriate, the same function calls, interfaces, api's, and the like.

9 Claims, 3 Drawing Sheets

EXTERNALIZED METRIC CALCULATION ENGINE

BACKGROUND

1. Field of the Invention

The present invention relates generally to methods, systems, and program products for calculating, detecting, observing, or validating operating characteristics, conditions, and metrics, especially quality of service metrics, of a system, and using the quality of service metrics to manage a service.

2. Background Art

Various business considerations have led a growing number of organizations to rely on external vendors to support their needs, such as order entry, order fulfillment, billing, lock box services, payment processing, customer service, help desk and technical support, and warranty service. Much of the day-to-day data on vendor performance from vendors are not available to the vendee, and typically the vendee organization ends up with its own systems and acceptance tests to validate the vendor services. The readiness of the vendor-services has been evaluated based primarily on the actual test execution results, including customer feedback. New metrics were derived to measure the degree of risk associated with a variety of test case failures such as time constraints and functionalities not enabled, bad fixes, and defects not fixed during successive iterations. The relationship of these metrics to the actual cause was validated through explicit communications with the vendor and the subsequent actions to improve the quality and completeness of the delivered service.

Appropriate use of metrics is vital to any project. These metrics help track aspects of an ongoing outsourced, customer support project, such as changing requirements, rates of finding and fixing defects, and growth in size and complexity of code. From the testing point of view, the metrics typically focus on the quantity and quality of service, the progress of testing, and the effectiveness of testing. Examples of typical metrics include product or release size over time, defect discovery rate over time, defect backlog over time, test progress over time (plan, attempted, actual), and percentage of test cases attempted.

The trend toward increased outsourcing of customer service and support demands the regular use of new metrics and methodology to assure adequate quality and schedule integrity. One of the challenges a vendee organization faces is the evaluation of the outsourced customer service and support in terms of functionality, performance, etc. Because of the implicit business risks in outsourcing customer services and support, the contractual commitments for quality and completeness are generally at a high level, and typically the vendee organization defines and executes its own acceptance test to validate expectations.

Meaningful metrics help users and developers evaluate performance and performance details and answer questions. These meaningful metrics can be derived from the execution data and used in an operational environment Formulating meaningful metrics requires conducting empirical studies—either experiments or case studies. Experiments give users and vendors more control, but they are harder to conduct and more expensive than a case study. Moreover, case studies usually yield more data that is accessible.

Most metric calculation engines only provide a high level framework to process the required calculations, and require user written code, frequently extensive user written code, to identify and capture inputs and outputs characterizing the metrics and to then structure the metric engine to perform necessary metric calculations. This code may be complex, and require training and experience to write.

Thus a need exists for an integrated system, independent of and not dependent on user written code to identify and capture inputs and outputs which characterize the process and its metrics and to then structure the metric engine to perform the requested and desired metric calculations. Such a system would respond to a simple, user submitted metric calculation request, e.g., performing business logic against incoming transaction data to translate the submitted transaction data into the required metrics, and present the results to the user.

SUMMARY OF THE INVENTION

These and other problems are obviated by the method, system, and program product described herein. Specifically, the invention described herein provides a method, an integrated system independent of user written code, and program product also independent of user written code, for processing a user submitted metric calculation request and associated captured data. As described herein the user submits a metric calculation request which may include an input-output matrix and processes and procedures for capture of systems data. The input-output matrix incorporates business rules and business models. The invention described herein decomposes the metric calculation request into elements corresponding to standardized, predefined configuration elements. These standardized, predefined configuration elements may be stored in a database.

The method, system, and program product assembles these standardized, predefined configuration elements to perform business logic against the incoming transaction data submitted as part of the metric calculation request and input-output matrix. This transaction data is then translated into the requested metric, and the result set stored in a database for delivery to the user.

The method, system, and program product described herein provides significantly reduced turn around time, provides repeatable error free metric calculations through reuse of tested reusable code modules. In a preferred exemplification the system is self documenting, where the configuration data serves as meta data describing the business logic used to derive the calculations.

THE FIGURES

Various aspects of the invention are illustrated in the figures appended hereto.

DETAILED DESCRIPTION

Figure 1:
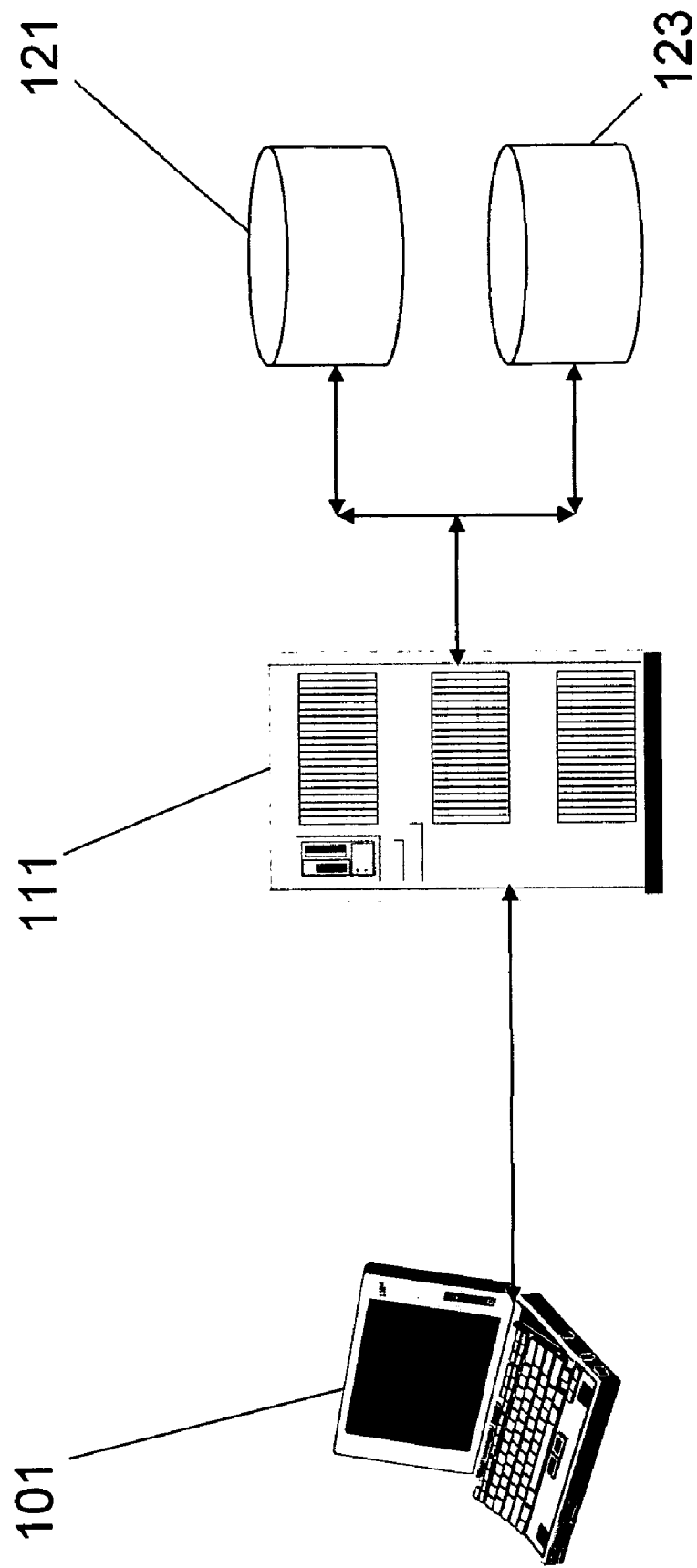
FIG. 1 is a high level representation of a system for practicing the invention, including a terminal, as a client processor, a server, and database management systems.

The method, system, and program product of our invention solves the challenge of processing a user submitted metric calculation. As described herein the user submits a metric calculation request which may include an input-output matrix or other enumeration of input and output data points. The set of input and output data points implicitly or explicitly incorporates the business rules, business logic, and business model of the customer process. The invention described herein decomposes the metric calculation request into elements corresponding to standardized, predefined configuration elements. These standardized, predefined configuration elements may be stored in a database.

In one preferred embodiment the method, system, and program product of the invention is used to determine metrics for protocol, procedure, software, and script driven processes, especially processes encompassing personal interactions. These processes include customer support and technical support processes, service agreements, help desk processes, unblocking and password resetting processes, and expediter processes, by way of example. In the case of network support services the support may be server side support or desk side support.

The method is carried out using an externalized metrics engine. As used herein a metrics engine tool or application is a computer tool or application that facilitates the rapid calculation of metrics, especially business process metrics. As is well known in the art a metrics engine allows any key measurement to be incorporated at any level into the results, with navigation being simple and intuitive, preferably with drill down and roll up A typical metrics engine includes the following functionalities: customizable import, including user-definable meta models and XML transformations; calculation of user-definable metrics; calculation of descriptive statistics; checking of user-definable design rules; design comparison: calculation of metric deltas and comparative descriptive statistics; and calculation of user-definable relation matrices. Additionally, a metrics engine should provide a model dump feature supporting export of data in various text and graphics formats.

Typical measurements that make up the metrics include, by way example and illustration, service response times, times to respond at first, and second levels, business logic levels, and times to resolve issues, such as servers, desk side, passwords, timeliness of response, and correctness of response.

In a preferred exemplification the method, system, and program product described herein may be used to develop metrics for service agreements containing service level timeliness commitments. These commitments may mandate compliance with metrics with respect to service response time, times to respond at first and second levels, metrics as a function of business logic, and quality and time of problem resolution resolve issues with respect to server issues, desk side desk side issues, network connection, password setting and resetting, and the like.

Another metric is the adequacy of the solution. This includes arriving at the correct solution with a minimum of incorrect suggestions, and locating the correct references and tools with a minimum number of incorrect queries, and using the correct references and tools. Another metric is the adequacy of the references and tools, and the adequacy of the capability to "drill down" through references and tools to more granular and focused solutions.

Still another input metric, functionally impacting the timeliness and correctness of the resolution, is the severity of the problem. The severity of the problem is a business decision, frequently determined when the problem is opened, and subsequently updated as the problem is investigated and attempts made at problem resolution.

The severity may be a function of the time of the onset of the problem, such as a holiday, weekend, i.e., a function of the relevant business clock According to our invention, the rules defining the transaction and the solution set are capable of being filtered down or drilled down to sets of transactions and rules for the specific transactions.

This enables conceptualization of the service levels, including:

Identification of the service issues,
Specification of service levels
Specification of response times
Capture in code In order to generate the metric engine herein contemplated, it is necessary to capture the transactions and rules in code. The code is repeatable and reusable The resulting code of the metric engine includes one or more data models, and tables, and is ultimately populated by data in the data values in the tables and matrices. The values in the metric engine tables are the business rules. These business rules are typically real world.

The metric engine itself consists of Java classes. These Java classes read the raw data, read the rules, compare the raw data to the rules, and generate calculations.

The metric engine captures the raw data off of log entries, phone entries, key stroke tracking, etc., obtaining the raw data from call centers operators and, field technicians.

One implementation of the system of our invention is illustrated in FIG. 1. The Figure illustrates a terminal 101, a server 111, and one or more data base management systems 121, 123. The terminal 101 may be a user's terminal or customer's terminal, but is more frequently a service provider's terminal, as a service technician's terminal, a call center terminal, or a wireless device.

The server 111 may be one or more physical or logical devices. The servers 121, 123 contain network logic, web server logic for a web based version of the invention, diagnostic and service logic as appropriate for customer service and support, system metrics, system performance data collection and analysis logic, and comparison logic for comparison system performance to system metrics.

Databases 121 and 123 contain metrics, system data for calculation of metrics and comparison of current data to the metrics, and analysis of the comparative data.

Figure 2:
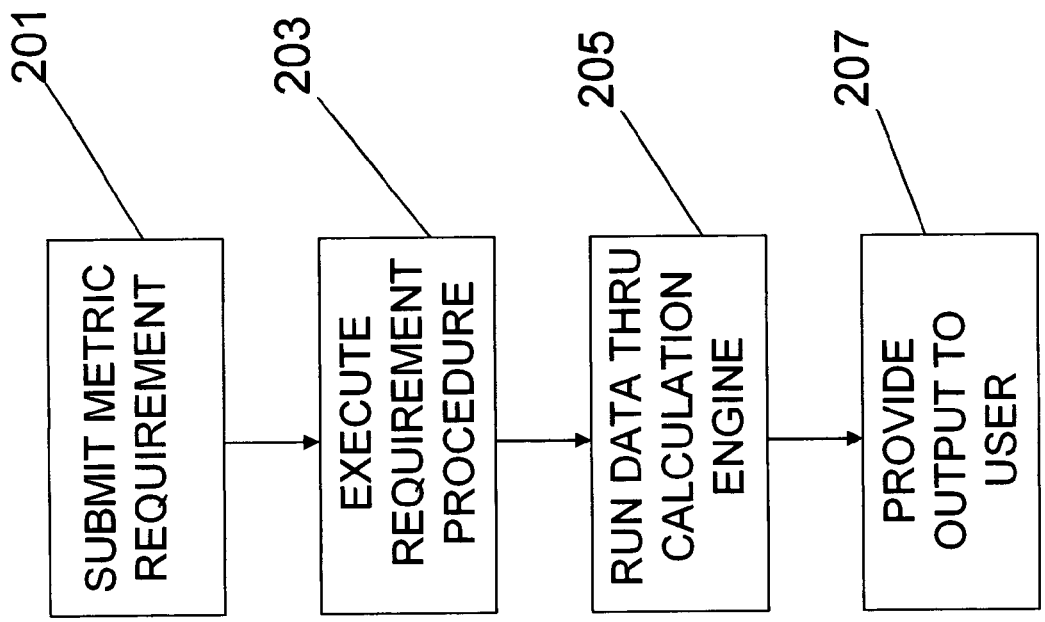
FIG. 2 is a high level flow chart of the method, system, and program product of the invention

FIG. 2 represents a high level overview of the method of the system. FIG. 2 illustrates one exemplification of the method of the invention. In practice the method would start from a metric requirement, e.g., submission of a metric requirement, 201, execution of the metric requirement procedure 203, with the data being run through the metric calculation engine 205, to result in an output provided a user 207.

Figure 3:
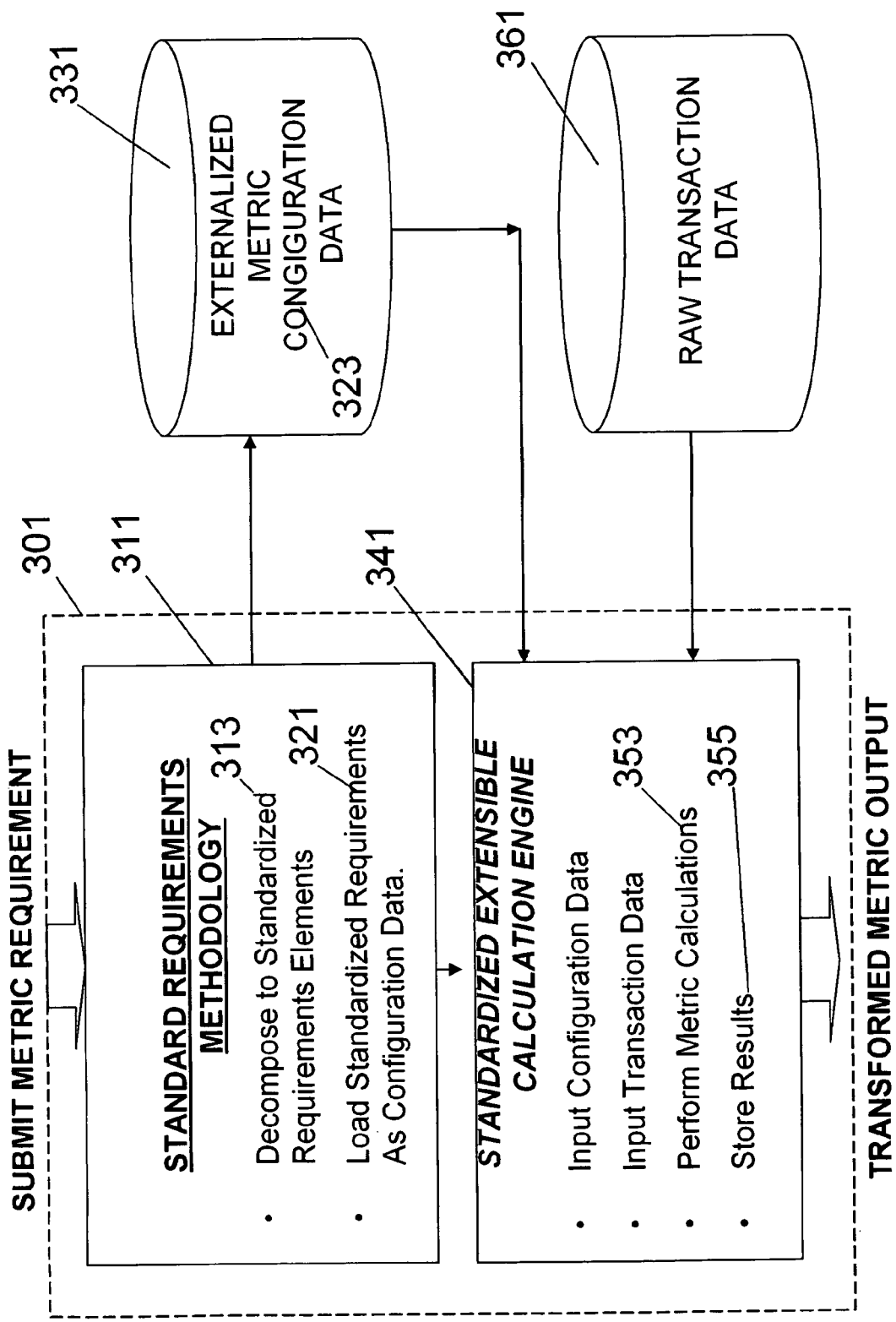
FIG. 3 is a more detailed representation of the flow chart shown in FIG. 2.

FIG. 3 illustrates the integration of the method and system of the invention. The first part is the submission or the metric requirement 301. Then a standard requirements methodology engine 311 decomposes the metric requirements 313 (which may be computer code, flow charts, or the like) to standardized requirements elements 321. These standardized requirements elements are loaded 321 as configuration data 323.

This configuration data is passed to and stored in an externalized metric configuration data database 331, The configuration data 323 from the standardized requirements methodology engine 311 and from the externalized metric configuration data database 331 is passed to a standardized extensible calculation engine 341.

The standardized extensible calculation engine 341 receives configuration data 323 from the externalized metric configuration data database 331, and transaction data 351 from a raw transaction data database 361. The standardized extensible calculation engine 341 performs metric calculations 353 and stores the results 355. The stored results are provided as transformed metric output 371.

The various elements of the system are integrated, with the same or substantially the same schema and metadata in the databases management systems of the externalized metric configuration data database 331, and the raw transaction data database 361. A further aspect of the invention is extensive code reuse, with the various engines, as the standard requirements methodology engine 311 and the standardized extensible calculation engine 341 utilize the same Java classes or C++ objects, and as appropriate, the same function calls, interfaces, api's, and the like. As used herein "reusable code" means using the same code modules, including Java classes and C++ modules, as appropriate, in various location within the engines, as in functions, function calls, interfaces, api's, and the search and calculation engines.

The invention may be implemented, for example, by having the system for receiving a metric determination request, decomposing the request into elements, e.g., predefined configuration units, and input-output matrices, searching, extracting, transforming, and loading the predefined configuration units, performing business logic defined by the configuration units against incoming transaction data, and presenting the calculated results by executing the method as a software application, in a dedicated processor or set of processors, or in a dedicated processor or dedicated processors with dedicated code. The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for searching, extracting, transforming, loading, and presenting data from a database management system as a software application.

This signal-bearing medium may comprise, for example, memory in a server. The memory in the server may be nonvolatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++", Java, Pascal, ADA, assembler, and the like.

Additionally, the program code may, for example, be compressed, encrypted, or both, and may include executable code, script code and wizards for installation, as in Zip code and cab code. As used herein the term machine-readable instructions or code residing in or on signal-bearing media include all of the above means of delivery.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:

1. A method for calculating system service metrics of a customer service process and for calculating service agreement metrics for a service agreement, wherein the service agreement is for providing a customer service process to a customer, the method comprising the steps of:
   a) submitting a metric requirement for a customer service process to a standard requirements methodology engine, wherein the metric requirement includes an enumeration of input and output data points that explicitly incorporate metrics for the customer service process, wherein the customer service process is a process that provides a personal human interaction to a customer, wherein the metrics include a business model and business rules for the business model, wherein the business model describes the customer service process, and wherein the business rules include a maximum acceptable service response time for the personal interaction to the customer;
   b) decomposing, by the standard requirements methodology engine, the metric requirement into standardized predefined configuration elements that include requirements elements and configuration data for the customer service process;
   c) loading the standardized predefined configuration elements into an externalized metric configuration database;
   d) passing the configuration data from the externalized metric configuration database to a standardized extensible calculation engine, wherein the standard requirements methodology engine and the standardized extensible calculation engine both utilize a same class, a same object, a same function call, and a same interface;
   e) collecting transaction data and passing the collected transaction data to the standardized extensible calculation engine;
   f) calculating metrics for the customer service process in the standardized extensible calculation engine, wherein the metrics describe the customer service process,
   g) storing the metrics as transformed metric output; and
   h) utilizing the transformed metric output to develop a first service agreement metric for a service agreement, wherein the service agreement contains service level timeliness commitments, and wherein the service level timeliness commitments mandate compliance with the maximum acceptable service response time for the personal interaction to the customer.

2. The method of claim 1, wherein the personal interactions to the customer are provided by a help desk, and wherein the help desk provides all services that are defined by the customer service process.

3. The method of claim 2, further comprising:
   i) utilizing the transformed metric output to develop a second service agreement metric for the service agreement, wherein the second metric describes an adequacy of the help desk in providing a solution to a customer's problem, wherein the adequacy is determined by the help desk:
      providing less than a predetermined number of incorrect suggestions;
      utilizing correct references to answer the customer question; and
      drilling down through the correct references to provide a focused solution to the customer's problem.

4. A system for calculating service metrics and service agreement metrics of a customer service process, the system comprising:
  a) a standard requirements methodology engine for:
    receiving a metric requirement for a customer service process, wherein the metric requirement includes an enumeration of input and output data points that explicitly incorporate metrics for the customer service process, wherein the customer service process is a process that provides a personal human interaction to a customer, wherein the metrics include a business model and business rules for the business model, wherein the business model describes the customer service process, and wherein the business rules include a maximum acceptable service response time for the personal interaction to the customer;
    decomposing the metric requirement into standardized predefined configuration elements that include requirements elements and configuration data for the customer service process;
    loading the standardized predefined configuration elements into an externalized metric configuration database; and
  b) logic for passing the configuration data from the externalized metric configuration database to a standardized extensible calculation engine, wherein the standard requirements methodology engine and the standardized extensible calculation engine both utilize a same class, a same object, a same function call, and a same interface, and wherein the standardized extensible calculation engine:
    collects transaction data and passes, the collected transaction data to the standardized extensible calculation engine;
    calculates metrics for the customer service process, wherein the metrics describe the customer service process,
    stores the metrics as transformed metric output; and
    utilizes the transformed metric output to develop a first service agreement metric for a service agreement, wherein the service agreement contains service level timeliness commitments, and wherein the service level timeliness commitments mandate compliance with the maximum acceptable service response time for the personal interaction to the customer.

5. The system of claim 4, wherein the personal interactions to the customer are provided by a help desk, and wherein the help desk provides all services that are defined by the customer service process.

6. The system of claim 4, wherein the standardized extensible calculation engine further:
  utilizes the transformed metric output to develop a second service agreement metric for the service agreement, wherein the second metric describes an adequacy of the help desk in providing a solution to a customer's problem, wherein the adequacy is determined by the help desk:
    providing less than a predetermined number of incorrect suggestions;
    utilizing correct references to answer the customer question; and
    drilling down through the correct references to provide a focused solution to the customer's problem.

7. A program product comprising a signal bearing medium substrate having computer readable program code thereon, said computer readable program code for configuring and controlling a computer for performing the process of:
  a) submitting a metric requirement for a customer service process to a standard requirements methodology engine, wherein the metric requirement includes an enumeration of input and output data points that explicitly incorporate metrics for the customer service process, wherein the customer service process is a process that provides a personal human interaction to a customer, wherein the metrics include a business model and business rules for the business model, wherein the business model describes the customer service process, and wherein the business rules include a maximum acceptable service response time for the personal interaction to the customer;
  b) decomposing, by the standard requirements methodology engine, the metric requirement into standardized predefined configuration elements that include requirements elements and configuration data for the customer service process;
  c) loading the standardized predefined configuration elements into an externalized metric configuration database;
  d) passing the configuration data from the externalized metric configuration database to a standardized extensible calculation engine, wherein the standard requirements methodology engine and the standardized extensible calculation engine both utilize a same class, a same object, a same function call, and a same interface;
  e) collecting transaction data and passing the collected transaction data to the standardized extensible calculation engine;
  f) calculating metrics for the customer service process in the standardized extensible calculation engine, wherein the metrics describe the customer service process,
  g) storing the metrics as transformed metric output; and
  h) utilizing the transformed metric output to develop a first service agreement metric for a service agreement, wherein the service agreement contains service level timeliness commitments, and wherein the service level timeliness commitments mandate compliance with the maximum acceptable service response time for the personal interaction to the customer.

8. The program product of claim 7, wherein the personal interactions to the customer are provided by a help desk, and wherein the help desk provides all services that are defined by the customer service process.

9. The program product of claim 7, wherein the computer readable program code is further configured for:
  i) utilizing the transformed metric output to develop a second service agreement metric for the service agreement, wherein the second metric describes an adequacy of the help desk in providing a solution to a customer's problem, wherein the adequacy is determined by the help desk:
    providing less than a predetermined number of incorrect suggestions;
    utilizing correct references to answer the customer question; and
    drilling down through the correct references to provide a focused solution to the customer's problem.

* * * * *